(12) United States Patent
Kam (10) Patent No.: US 6,225,918 B1
(45) Date of Patent: May 1, 2001

(54) AUTOMATIC WARNING SIGNAL SYSTEM FOR VEHICLES

(76) Inventor: Bing Kam, 6902 Midhurst, Memphis, TN (US) 38119

( * ) Notice: Subject to any disclaimer, the term of this patent is extended or adjusted under 35 U.S.C. 154(b) by 0 days.

(21) Appl. No.: 09/253,163

(22) Filed: Feb. 19, 1999

(51) Int. Cl.[7] .................................................. G08G 1/16
(52) U.S. Cl. ........................ 340/903; 340/435; 180/169
(58) Field of Search ................................. 340/903, 435, 340/436, 479; 180/169, 167; 280/735, 734

(56) References Cited

U.S. PATENT DOCUMENTS

| | | | |
|---|---|---|---|
| 3,874,743 | * 4/1975 | Fleischer et al. .................... | 340/903 |
| 4,168,499 | 9/1979 | Matsumura et al. ................. | 7/12 |
| 4,180,816 | 12/1979 | Endo et al. ......................... | 7/40 |
| 4,208,658 | 6/1980 | Fujiki et al. ........................ | 9/2 |
| 4,394,477 | 7/1983 | Screeton ............................. | 5/9 |
| 5,139,327 | 8/1992 | Tanaka ............................... | 7/18 |
| 5,159,557 | 10/1992 | Ogawa . | |
| 5,187,537 | 2/1993 | Asayama . | |
| 5,212,467 | 5/1993 | Park . | |
| 5,214,408 | 5/1993 | Asayama . | |
| 5,235,316 | 8/1993 | Qualizza . | |
| 5,268,692 | 12/1993 | Grosch et al. ....................... | 13/60 |
| 5,287,085 | * 2/1994 | Smith ................................. | 340/438 |
| 5,347,273 | 9/1994 | Katiraie .............................. | 1/16 |
| 5,388,048 | 2/1995 | Yavnayi et al. ..................... | 15/50 |
| 5,432,509 | 7/1995 | Kajiwara ............................ | 1/16 |
| 5,436,835 | 7/1995 | Emry .................................. | 8/32 |
| 5,574,426 | 11/1996 | Shisgal et al. . | |
| 5,627,510 | 5/1997 | Yuan . | |
| 5,684,474 | * 11/1997 | Gilon et al. ......................... | 340/903 |
| 5,760,708 | * 6/1998 | Seith ................................... | 340/903 |
| 5,838,228 | * 11/1998 | Clark .................................. | 340/436 |
| 5,874,904 | * 2/1999 | Hirabayashi et al. ............... | 340/903 |
| 5,923,243 | * 7/1999 | Bleiner ............................... | 340/435 |
| 6,072,391 | * 6/2000 | Suzuki et al. ....................... | 340/468 |

OTHER PUBLICATIONS

Migraton Corporation, *Ultrasonic Sensors* 1997.

* cited by examiner

*Primary Examiner*—Jeffery Hofsass
*Assistant Examiner*—Anh La
(74) *Attorney, Agent, or Firm*—Walker, McKenzie & Walker, P.C.

(57) ABSTRACT

An automatic warning signal system for a leading vehicle (e.g., an automobile, car, truck, tanker, van, bus, motor home, motorcycle, or other vehicles, etc.) including a detector for detecting when a following vehicle comes within a target area too close to the rear of the leading vehicle, and a circuit for coupling a signal device and an energy source to cause the signal device to produce a warning signal which includes activating the brake light or lights of the leading vehicle without the actual application of the brakes to caution the driver of the following vehicle when the detector detects the following vehicle within the target area too close to the rear of the leading vehicle, causing the driver of the following vehicle to slow down and thus increase the distance between the two vehicles and prevent rear end collision in case of an emergency.

16 Claims, 5 Drawing Sheets

FIG. 6

AUTOMATIC WARNING SIGNAL SYSTEM FOR VEHICLES

CROSS-REFERENCE TO RELATED APPLICATIONS

Not Applicable.

STATEMENT RE FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

The present invention relates, in general, to an automatic warning signal system for a leading vehicle (e.g., an automobile, car, truck, tanker, van, bus, motor home, motorcycle, or other vehicles, etc., as well as trailers of all kinds in-tow, etc.) to caution or warn the driver of a following vehicle that it is following the leading vehicle too close and to either slow down, change lanes, or pass, etc.

2. Background Art

A preliminary patentability search produced the following patents which appear to be relevant to the present invention:

Katiraie, U.S. Pat. No. 5,347,273, issued Sep. 13, 1994, discloses an adjustable ultrasonic collision warning system for an automobile or the like which warns the driver of that automobile or the like of the presence of an obstruction, another automobile, etc., within a detection field.

Kajiwara, U.S. Pat. No. 5,432,509, issued Jul. 11, 1995, discloses a warning apparatus for a vehicle that generates a warning for the driver of that vehicle when the separation between that vehicle and an obstacle located in front of that vehicle falls below a prescribed value.

Nothing in the known prior art discloses or suggests the present invention. More specifically, nothing in the known prior art discloses or suggests an automatic warning signal system for a leading vehicle that warns the driver of a following vehicle when the following vehicle comes within a target area behind the leading vehicle.

One of the most common problems in automobile accidents is rear end collisions resulting in thousands upon thousands of deaths and injuries, as well as countless millions of dollars of property damages. The problem of being hit at the rear end is simply being followed too close for the most part. Hectic daily lives, poor driving habits, not paying attention, driving while tired and sleepy, driving under the influence of alcohol or drugs, etc., all contribute to automobile accidents. Nothing in the known prior art provides any means for use by the driver of the leading vehicle to prevent or hinder such rear end collisions.

What the driver of the leading vehicle needs is a warning signal to automatically warn the driver of the following vehicle that he or she is following too close behind the leading vehicle. It is desirable that such a warning signal will effectively cause the driver of the following vehicle to slow down, thus increase the distance between the leading and following vehicles and prevent a rear end collision in case of an emergency or the like. It is further desirable that such a warning signal be simple and inexpensive to make.

BRIEF SUMMARY OF THE INVENTION

The present invention provides an automatic warning signal system for a first or leading vehicle to warn or signal the driver of a second or following vehicle that the second or following vehicle is following the leading vehicle too closely.

The automatic warning signal system of the present invention is for use with a leading vehicle, an energy source and a signal means that produces a warning signal when energized, and comprises, in general, detector means for detecting when a following vehicle comes within a target area behind the leading vehicle, and circuit means for coupling the detector means to the signal means and the energy source and for energizing the signal means to produce a warning signal to caution or warn the driver of the following vehicle when the detector means detects the following vehicle within the target area behind the leading vehicle.

One object of the present invention is to provide an automatic warning signal system for a leading vehicle that turns on the brake lights of the leading vehicle without actual application of the brakes of the leading vehicle by means of a detector such as an ultrasonic sensor installed at the tail end of the leading vehicle for detecting any following vehicle within some predetermined distance of the tail end of the leading vehicle, causing the driver of the following vehicle to instinctively slow down, thus increasing the distance between the two vehicles and prevent a rear end collision in case of an emergency or the like.

Another object of the present invention is to provide such an automatic warning signal system for a leading vehicle with warning means for warning the driver of the following vehicle when the brake lights of the leading vehicle are activated by the automatic warning signal system and not by the actual application of the brakes of the leading vehicle. The warning means may include a caution means for spelling out an informative message, and or distinctive caution lights (e.g., amber colored caution lights).

Another object of the present invention is to provide such an automatic warning signal system for a leading vehicle with the warning means wired in series with the brake lights and in front of the brake lights so that malfunction of the warning means prevents the automatic warning signal system from operating the brake lights.

Another object of the present invention is to provide such an automatic warning signal system for a leading vehicle with indicator means for indicating to the driver of the leading vehicle when the warning means has malfunctioned and has prevented the automatic warning signal system from operating the brake lights.

Another object of the present invention is to provide such an automatic warning signal system for a leading vehicle that provides an extra safety feature in the case of slippery or icy road conditions when a driver of a leading vehicle may avoid or minimize the application of the brakes to slow down and, instead, use the vehicle's transmission to slow down by shifting into a lower gear whereby the brake lights of the leading vehicle will not be activated to warn the driver of any following vehicle that the driver of the leading vehicle has taken active steps to slow down, etc. The automatic warning signal system of the present invention will, in such a case, alert and warn the driver of the following vehicle to slow down and help prevent rear end collisions, etc.

Another object of the present invention is to provide such an automatic warning signal system for a leading vehicle that causes the brake lights and warning means to come on intermittently, simulating tapping of the brake pedal of the leading vehicle, by means of a delayed flasher or a parallel series of flashers of different time intervals, designed to come on alternatively.

Another object of the present invention is to provide such an automatic warning signal system for a leading vehicle to automatically warn the driver of a following vehicle repeatedly as long as the following vehicle is within the target area behind the leading vehicle, causing the driver of the following vehicle to stay back, change lanes, or pass, etc.

Another object of the present invention is to provide such an automatic warning signal system for a leading vehicle that alerts the driver of the following vehicle.

Another object of the present invention is to provide an automatic warning signal system for a leading vehicle with an automatic range selection so that the automatic warning signal system is normally set on short range (i.e., for city driving, etc.), but will automatically switch to a long range upon the occurrence of one of a number of predetermined conditions such as, for example, if the speed of the leading vehicles increases to a predetermined amount (e.g., for highway driving), if the headlights of the leading vehicle are turned on (e.g., for night time or foggy driving conditions), or if the windshield wipers of the leading vehicle are turned on (e.g., for driving in the rain or on wet pavement), etc., that require a greater safe distance between the leading and following vehicles, and will automatically switch back to the short range when the speed of the leading vehicles decreases below that predetermined amount, when the headlights of the leading vehicle are turned off, when the windshield wipers of the leading vehicle are turned off, etc.

Another object of the present invention is to provide such an automatic warning signal system for a leading vehicle with a manual overriding long range sensitivity switch and a manual overriding short range sensitivity switch for special conditions.

Another object of the present invention is to provide such an automatic warning signal system for a leading vehicle with a normally on switch that can be manually moved to the off position if desired for special occasions such as towing a trailer. When the switch is in the off position, the automatic warning signal system is not in operation and the brake lights function as normal.

Another object of the present invention is to provide such an automatic warning signal system for a leading vehicle with an automatic minimum speed activated on/off switch to automatically turn off the automatic warning signal system when the speed of the leading vehicle falls below a designated amount and/or to a stop, and will automatically turn the automatic warning signal system back on when the leading vehicle starts moving forward again to a speed over the designated speed allowing the leading vehicle to get a good start after stopping or slowing down below the designated speed.

Yet another object of the present invention is to provide such an automatic warning signal system for a leading vehicle with a normally closed single pole-single throw relay switch which will break the circuit of the automatic warning signal system whenever the actual application of the brakes occurs.

Thousands upon thousands of lives and injuries, as well as countless millions of dollars of property damage, will be saved due to the present simple and inexpensive invention. The present invention does something invaluable that nothing could do before.

DETAILED DESCRIPTION OF THE INVENTION

Figure 1:
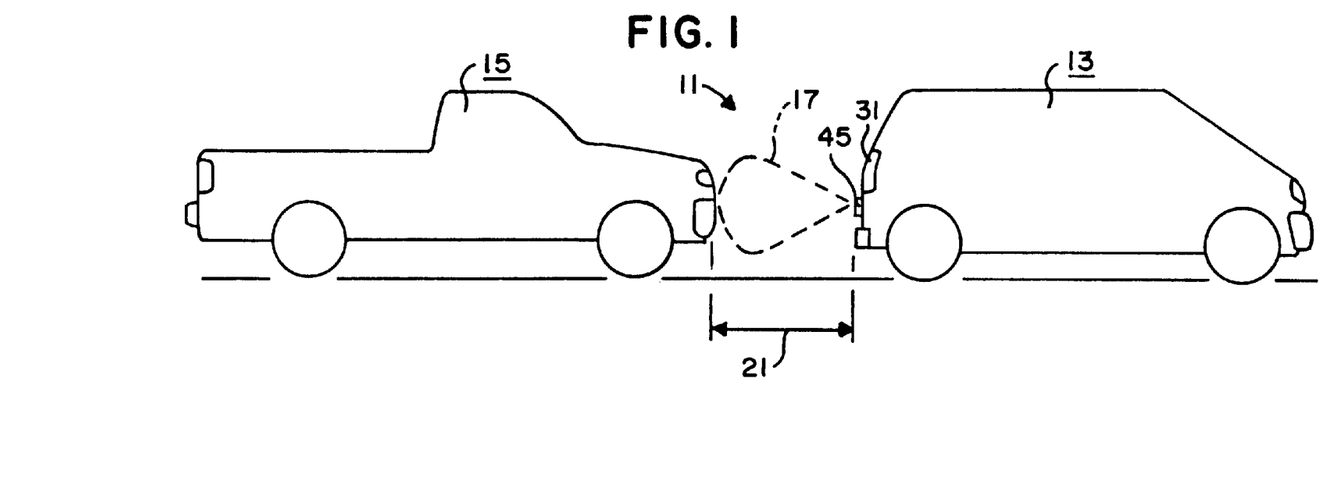
FIG. 1 is a somewhat diagrammatic side elevation of two vehicles travelling in the same direction one after the other with the automatic warning signal system of the present invention combined with the front or leading vehicle.
Figure 2:
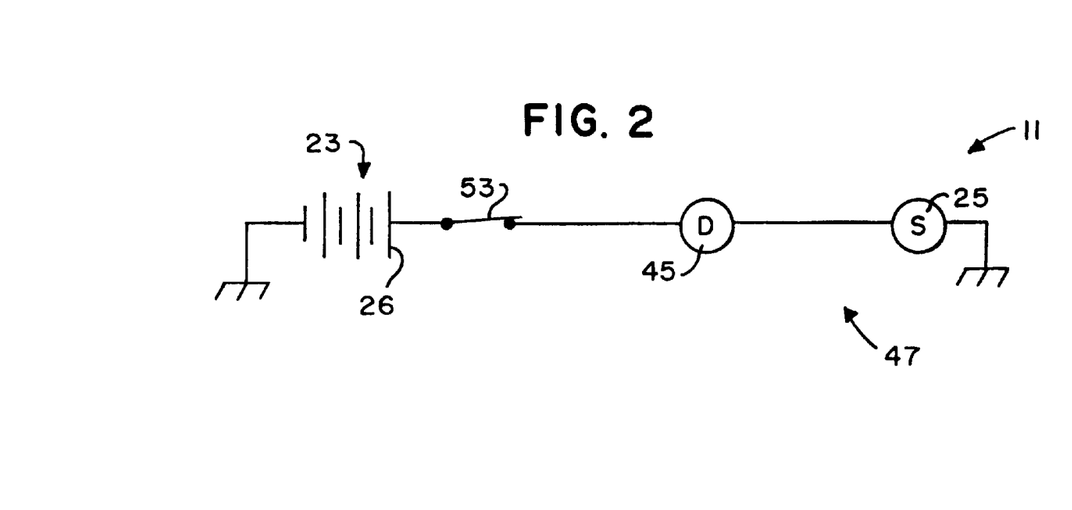
FIG. 2 is an electrical schematic of a base embodiment of the automatic warning signal system of the present invention of FIG. 1.
Figure 3:
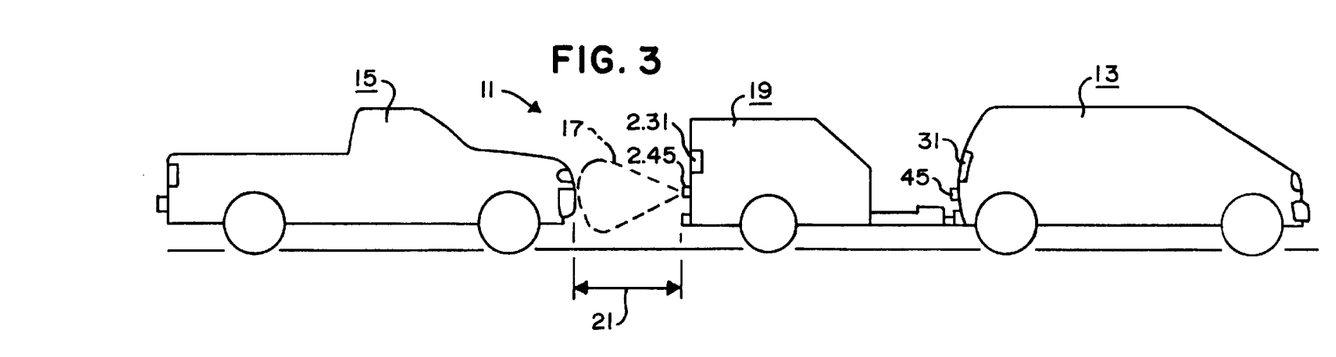
FIG. 3 is a somewhat diagrammatic side elevation of two vehicles travelling in the same direction one after the other with a towing vehicle (e.g., a front or leading vehicle) pulling a towed vehicle (e.g., a trailer) and with the automatic warning signal system of the present invention combined with both the towing vehicle and the towed vehicle.

The automatic warning signal system of the present invention, as illustrated by FIGS. 1–10, is identified by the numeral 11. In general, the automatic warning signal system 11 is specifically designed to cause a first or leading vehicle 13 to automatically produce a warning signal to caution or warn the driver of a second or following vehicle 15 when the following vehicle 15 comes within a target area 17 behind the leading vehicle 13 or behind a towed vehicle 19 being towed by the leading vehicle 13 as shown in FIG. 3.

The term "vehicle" is used herein to include, for example, automobiles, cars, trucks, vans, buses, motor homes, tankers, motorcycles, or other vehicles, etc., as well as trailers of all kinds in-tow.

The phrase "target area" is used herein to mean an area or space extending generally from the rear of a vehicle (e.g., from the rear of the leading vehicle 13 as shown in FIG. 1, or from the rear of the towed vehicle 19 as shown in FIG. 3) a certain distance or reach 21 substantially directly behind the vehicle as indicated by arrows in FIGS. 1 and 3. The automatic warning signal system 11 preferably has two or more distinct "target areas," a first or short range having a reach 21 of between, for example, 9 feet (2.7432 meters) and 21 feet (6.4008 meters) for normal city or low speed driving, etc., and a second or long range having a reach 21 of between, for example, 21 feet (6.4008 meters) and 33 feet (10.0584 meters) for normal highway or high speed driving or for hazardous conditions (e.g., wet or slick road conditions, night time or reduced visibility), etc.

The automatic warning signal system 11 is designed to be used in combination with an energy source 23 and a signal means 25 for producing a warning signal when activated by the energy source 23.

The energy source 23 preferably consists of an electrical energy source such as a typical 12 volt, direct current battery 26 or the like. The battery 26 may be the standard battery of the leading vehicle 13, etc., or may be a self-contained, dedicated battery, etc., for activating the signal means 25 as will now be apparent to those skilled in the art.

The signal means 25 may consist of any means for producing an audible or visual signal, or both, to signal the driver of the following vehicle 15 in the event any portion of the following vehicle 15 comes within the target area 17 behind the leading vehicle 13. For example, the signal means 25 may consist of a horn, siren, bell or other audible means to produces a loud sound to signal or otherwise warn the driver of the following vehicle 15 in the event that the driver of the following vehicle 15 "tailgates" or otherwise drives hazardously close to the rear of the leading vehicle 13. The signal means 25 preferably includes light means for producing a visual signal to so warn the driver of the of the following vehicle 15. More specifically, the signal means 25 preferably includes the typical brake light or lights of the leading vehicle 13 so that the brake light or lights of the leading vehicle 13 will be activated without the actual application of the brakes in the event that the driver of the following vehicle 15 "tailgates" or otherwise drives hazardously close to the rear of the leading vehicle 13, thereby warning the driver of the following vehicle 15 that the following vehicle 15 is following the leading vehicle 13 too close and to either slow down, change lanes, or pass, etc. Thus, as clearly shown in FIG. 5, the signal means 25 may include the typical left and right brake lights 29, 31, and the typical high and/or center mount brake light 33, if any, of the leading vehicle 13 as shown schematically in FIG. 5.

Furthermore, when the signal means 25 includes the typical brake light or lights of the leading vehicle 13, etc., the signal means 25 preferably includes an information or warning means 41 to clearly inform and/or warn the driver of the following vehicle 15 when the activation of the brake lights 29, 31, 33 of the leading vehicle 13 is caused by the automatic warning signal system 11, and not by the application of the brakes of the leading vehicle 13. The information or warning means 41 may include means for causing a warning signal, for example, a word like "CAUTION" to be superimposed over one or all of the brake lights 29, 31, 33 of the leading vehicle 13 (e.g., the high and/or center mount brake light 33 of the leading vehicle 13 as shown diagrammatically in FIG. 8), or to be displayed separate from but preferably adjacent to one or all of the brake lights 29, 31, 33 of the leading vehicle 13 (e.g., directly beneath the high and/or center mount brake light 33 of the leading vehicle 13 as shown diagrammatically in FIG. 10,). The information or warning means 41 may include a caution light means 43 or the like (e.g., a string of light emitting diodes, a neon light unit, a fiber optic light unit, etc.) that spells out an informative message such as the word "CAUTION" or the like when activated, and/or may include one or more caution lights 44 (e.g., amber colored lights) preferably located adjacent to one or all of the brake lights 29, 31, 33 of the leading vehicle 13 (e.g., on each side of the high and/or center mount brake light 33 of the leading vehicle 13 as shown diagrammatically in FIGS. 7 and 8, or on each side of the separate caution light means 43 as shown diagrammatically in FIGS. 9 and 10).

The automatic warning signal system 11 includes a detector means 45 for detecting when a following vehicle 15 comes within the target area 17 of a leading vehicle 13, and circuit means 47 for coupling the detector means 45, the energy source 23, and the signal means 25 to one another so that the signal means 25 will automatically produce a warning signal to caution the driver of the following vehicle 15 when the detector means 45 detects the following vehicle 15 within the target area 17 of the leading vehicle 13.

The detector means 45 may include any known device capable of sensing the distance to an object such as a device which generates a beam of radiation (e.g., radar, or ultrasonic waves, etc.) for being reflected on the object and returned to the device, or an imaging device which forms an image of the object and measures the separation based on the image, etc. The construction and operation of such devices are well known to those skilled in the art. See, for example, the obstacle sensor 2 disclosed in Kajiwara, U.S. Pat. No. 5,432,509, issued Jul. 11, 1995, incorporated herein by reference, and the various ultrasonic sensors manufactured by Migatron Corp., 935 Dieckman Rd., Woodstock, Ill. 60098. The detector means 45 preferably consists of at least one ultrasonic sensor operated on 12 volts, direct current, having a range between 2 feet and 40 feet, a beam spread of 20° or so, and an angle of tilt of plus or minus 10° or so, that functions like a simple on/off switch by moving between a normally opened position when no object is detected (thus preventing the passage of electrical energy therethrough) and a closed position when it detects an object (thus allowing the passage of electrical energy therethrough) as will now be apparent to those skilled in the art. The sensor head of a single detector means 45, or a spaced plurality of such detector means 45, may be mounted on the rear of the leading vehicle 13 as clearly shown in FIGS. 1, 3 and 7–10, and may be similarly mounted on the rear of the towed vehicle 19 as shown in FIG. 3.

The detector means 45 preferably has two or more distinct range sensitivity selections that can be selected by way of a switch 49 or the like (see FIGS. 5 and 6) to thereby vary the reach 21 of the target area 17. The switch 49 may be part of a single-pole, double-throw relay circuit 51 as will hereinafter become apparent. Thus, the detector means 45 may have a first or short range sensitivity selection to provide a target area 17 having a first or short reach 21 for detecting objects between, for example, 9 feet (2.7432 meters) and 21 feet (6.4008 meters), and a second or long range sensitivity selection to provide a target area 17 having a second or long reach 21 for detecting objects between, for example, 21 feet (6.4008 meters) and 33 feet (10.0584 meters), etc., as will now be apparent to those skilled in the art.

The circuit means 47 preferably provides an electric circuit for the passage of electrical energy from the battery 26 to the signal means 25, etc. Base embodiments of the circuit means 47 are shown in FIG. 2 for an individual leading vehicle 13 and in FIG. 4 for a combined leading, or tow, vehicle 13 and a towed vehicle 19.

In FIG. 2, the circuit means 47 merely electrically connects the battery 26 to the detector means 45 through a manual on/off main switch 53, and then electrically connects the detector means 45 to the signal means 25, with the electric circuit made through typical chassis grounds or the like. The manual on/off main switch 53 is preferably a normally closed switch so that the automatic warning signal system 11 will be automatically activated whenever the typical ignition switch (not shown), etc., of the vehicle 13 is turned to the on position, as will now be apparent to those skilled in the art.

Figure 4:
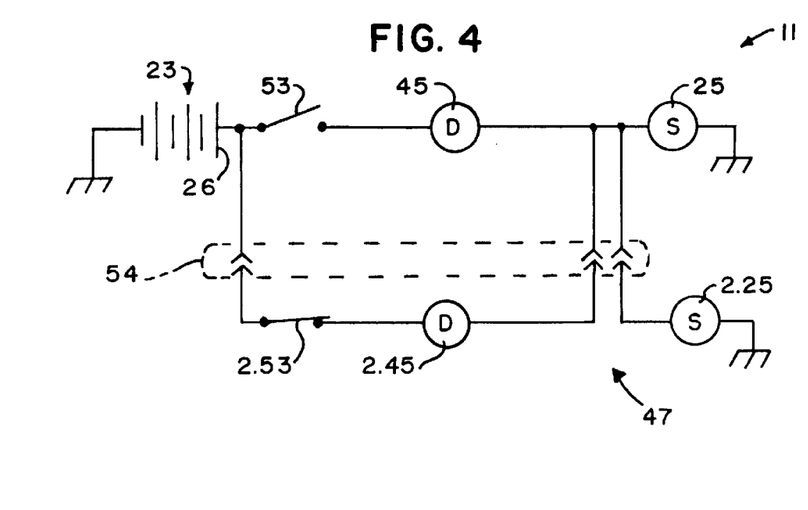
FIG. 4 is an electrical schematic of a base embodiment of the automatic warning signal system of the present invention of FIG. 3.

In FIG. 4, the circuit means 47 also electrically connects the battery 26 to the detector means 45 through a manual on/off main switch 53, and then electrically connects the detector means 45 to the signal means 25, with the electric circuit made through typical chassis grounds or the like. However, in FIG. 4, the circuit means 47 also electrically connects the battery 26 to a second detector means 2.45 through a second manual on/off main switch 2.53, and then electrically connects the detector means 2.45 to a second signal means 2.25, with the electric circuit made through typical chassis grounds or the like, and through typical plug-and-jack type electrical connectors 54 or the like, commonly used to electrically connect the light system of a trailer to the light system of a tow vehicle, as will now be apparent to those skilled in the art. The second manual on/off main switch 2.53 is also preferably a normally closed switch so that the automatic warning signal system 11 will be automatically activated whenever the typical ignition switch (not shown), etc., of the vehicle 13 is turned to the on position, as will now be apparent to those skilled in the art. However, when the electric circuit extends to the towed vehicle 19 via the electrical connectors 54 or the like, the manual on/off main switch 53 is preferably manually moved to the opened position to thereby break the electric circuit to the detector means 45 as will now be apparent to those skilled in the art. The second detector means 2.45 is preferably identical to the first detector means 45 but is mounted to the rear of the towed vehicle 19 rather than the rear of the leading vehicle 13. The second signal means 2.25 is preferably substantially identical to the signal means 25 but is associated with the towed vehicle 19 rather than the leading vehicle 13. The circuit means 47 may electrically couple the signal means 25, 2.25 to the second detector means 2.45 so that both signal means 25, 2.25 will be electrically activated if the second detector means 2.45 detects the following vehicle 15 within the target area 17 of the towed vehicle 19 as will now be apparent to those skilled in the art, or may only electrically couple the second signal means 2.25 to the second detector means 2.45 so that only the second signal means 2.25 will be electrically activated if the second detector means 2.45 detects the following vehicle 15 within the target area 17 of the towed vehicle 19 as will now be apparent to those skilled in the art.

Figures 5, 5A:
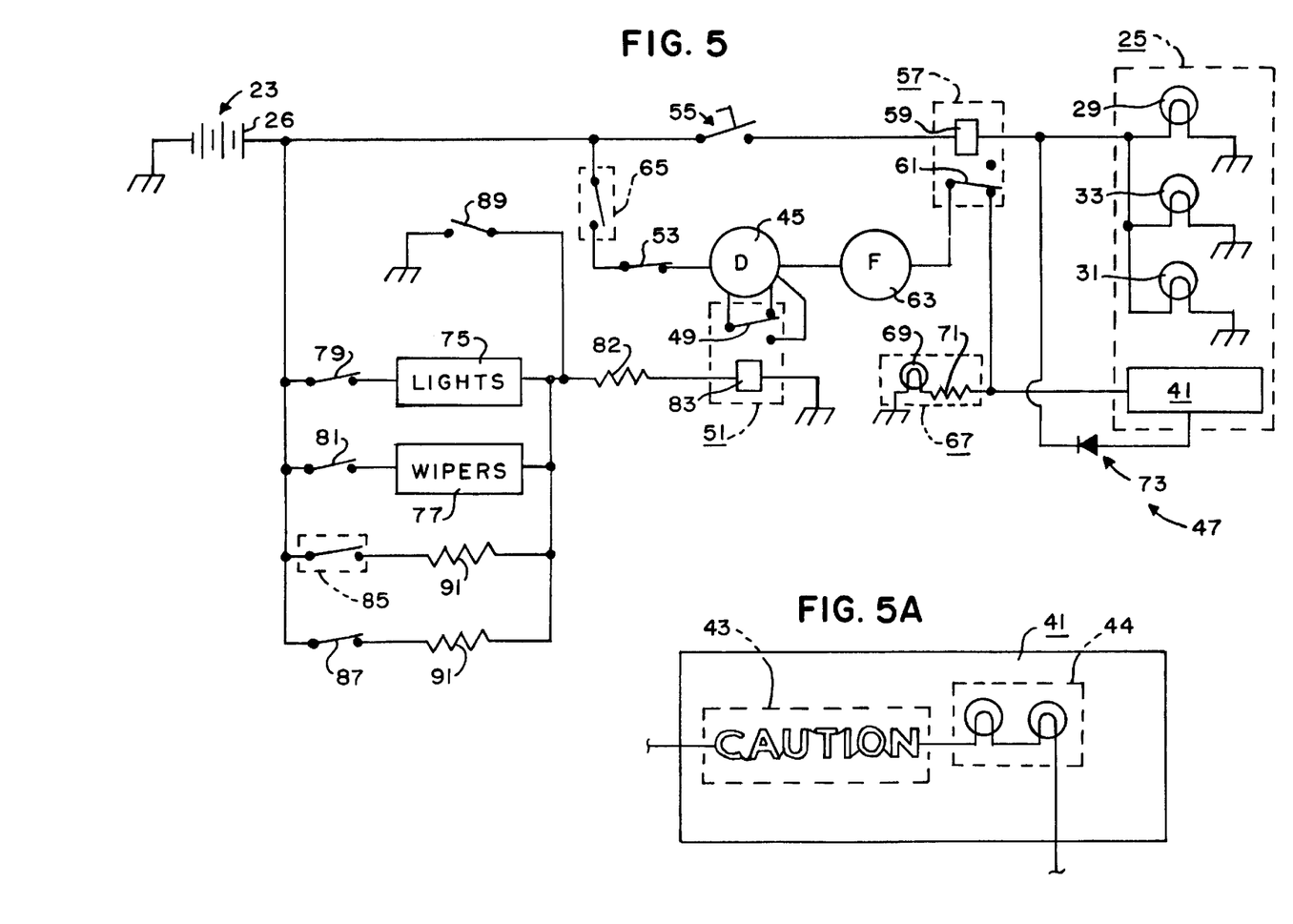
FIG. 5 is an electrical schematic of a detailed embodiment of the automatic warning signal system of the present invention for use with a single, non-towing vehicle, etc.
FIG. 5A is an electrical schematic of a portion of the schematic of FIG. 5, showing additional details thereof.
Figure 6:
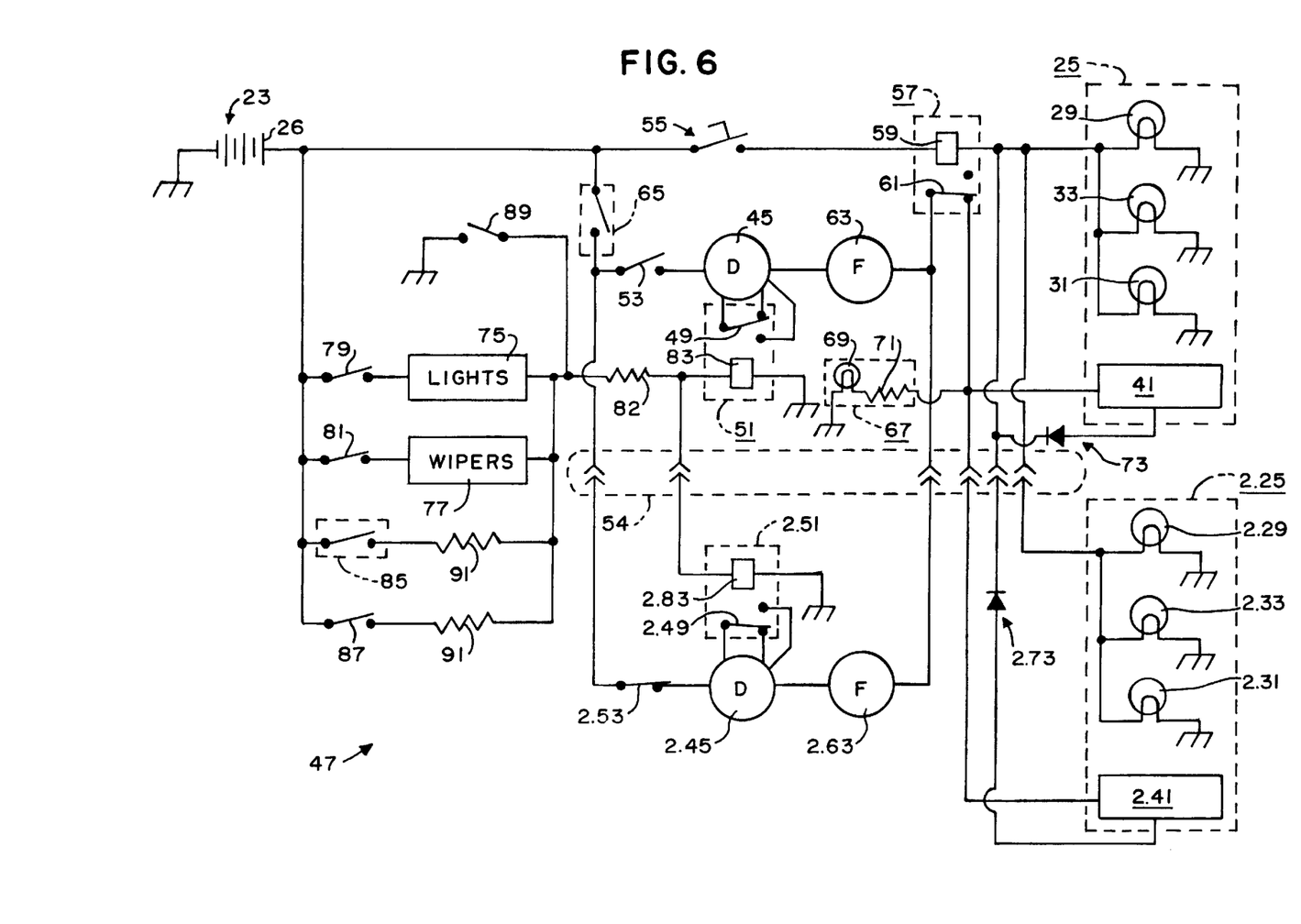
FIG. 6 is an electrical schematic of a detailed embodiment of the automatic warning signal system of the present invention for use with a towing and towed vehicle.
Figure 7:
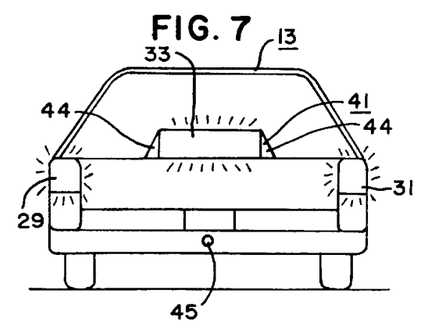
FIG. 7 is a somewhat diagrammatic rear elevational view of a vehicle with the automatic warning signal system of the present invention combined therewith, with the brake lights of the vehicle shown activated by the actual application of the brakes but with the automatic warning signal system of the present invention inactivated.
Figure 8:
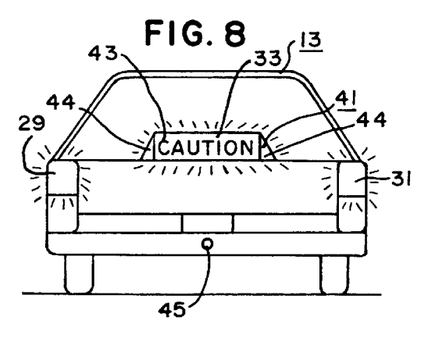
FIG. 8 is a somewhat diagrammatic rear elevational view of the vehicle of FIG. 7 with the automatic warning signal system of the present invention shown activated but without the actual application of the brakes.
Figure 9:
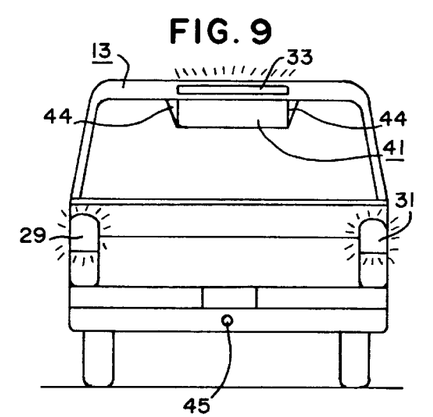
FIG. 9 is a somewhat diagrammatic rear elevational view of a vehicle similar to FIG. 7 but showing a modified construction of the automatic warning signal system of the present invention, with the brake lights of the vehicle shown activated by the actual application of the brakes but with the automatic warning signal system of the present invention inactivated.
Figure 10:
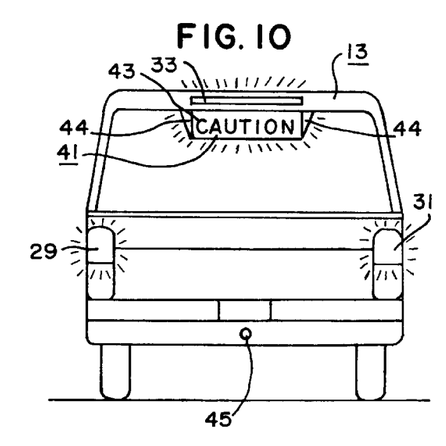
FIG. 10 is a somewhat diagrammatic rear elevational view of the vehicle of FIG. 9 with the automatic warning signal system of the present invention shown activated but without the actual application of the brakes.

Preferred embodiments of the circuit means 47, combined with the electrical system of the leading vehicle 13, are shown diagrammatically in FIG. 5 for a individual leading vehicle 13 and in FIG. 6 for a combined leading, or tow, vehicle 13 and a towed vehicle 19.

In FIG. 5, the standard brake switch 55 of the leading vehicle 13 is electrically coupled between the battery 26 and the brake lights 29, 31, 33 of the leading vehicle 13 in the normal manner so that the brake lights 29, 31, 33 of the leading vehicle 13 will be activated when the driver of the leading vehicle 13 depresses the brake pedal of the leading vehicle 13, etc. The circuit means 47 also electrically connects the battery 26 to the detector means 45 through a manual on/off main switch 53, and then electrically connects the detector means 45 to the signal means 25, with the electric circuit made through typical chassis grounds or the like, so that when the detector means 45 detects a following vehicle 15 within the target area 17, the signal means 25 will be activated to thereby warn or caution the driver of the following vehicle 15 that the following vehicle 15 is too close to the rear of the leading vehicle 13 and to either slow down, change lanes, or pass, etc. The circuit means 47 preferably includes a normally closed, single-pole, single-throw relay 57, having a coil 59 and a switch 61, for automatically breaking the electric circuit between the detector means 45 and the signal means 25 when the brake switch 55 is closed as will now be apparent to those skilled in the art.

The circuit means 47 may include a flasher means 63 for causing the signal means 25 to be intermittently activated when the detector means 45 detects a following vehicle 15 within the target area 17, to enhance the warning given by the signal means 25, etc. The flasher means 63 may consist of a typical thermal flasher, electromechanical flasher, etc., commonly used in automotive electrical systems to cause the turn signals, hazard lights, etc., of an automobile to flash intermittently as will now be apparent to those skilled in the art. When combined with the brake lights 29, 31, 33 of the leading vehicle 13, etc., the flasher means 63 will activate the brake lights 29, 31, 33, etc., intermittently in such a manner so as to simulate tapping of the brake pedal of the leading vehicle 13, etc., by means of a delayed flasher, or a parallel series of flashers of different time intervals, designed to come on alternatively, so that no set pattern of activation of the signal means 25 will be readily apparent to the driver of the following vehicle 15.

The circuit means 47 may include an automatic minimum speed activated on/off switch means 65 for preventing the circuit means 47 from activating the signal means 25 unless the leading vehicle 13 is moving faster than a certain minimum speed. The automatic minimum speed activated on/off switch means 65 preferably consists of an automatic switch for automatically closing when the leading vehicle 13 moves at the certain minimum speed. Such an automatic switch may be constructed in various manners, such as, for example, as an automatic speed activated on/off switch that operates like a speed warning buzzer feeler switch that was installed in combination with the speedometer in many automobiles back in the 1960's, or so, to warn drivers if a certain speed was reached and/or exceeded, and preferably is adjustable so that the driver of the leading vehicle 13 can adjust the speed at which the automatic minimum speed activated on/off switch means 65 will close to allow the detector means 45 to activate the signal means 25 depending on driving conditions such as icy roads, etc. The automatic minimum speed activated on/off switch means 65 turns the circuit means 47 off to prevent the activation of the signal means 25 whenever the speed of the leading vehicle 13 falls below the designated speed (e.g., 20 or 30 miles per hour) to a stop. When the leading vehicle 13 starts moving forward again to a speed over the designated speed, the automatic minimum speed activated on/off switch 65 turns the circuit means 47 back on so it can activate the signal means 25 when a following vehicle 15 is within the target area 17. In other words, the detector means 45 does not activate the signal means 25 when the leading vehicle 13 is moving slowly (e.g., in typical city driving) or stopped (e.g., at a stop sign in city driving, etc.), or even after the leading vehicle 13 starts moving forward again from a stop, even if a following vehicle 15 is within the target area 17, until the speed of the leading vehicle 13 reaches the designated speed, thereby allowing the leading vehicle 13 to get a good start after stopping or slowing down below the designated speed.

As clearly shown in FIG. 5, the information or warning means 41 is preferably wired in series between the detector means 45 and the brake lights 29, 31, 33 of the leading vehicle 13 so that any malfunction of the information or warning means 41 will break the electric circuit between the detector means 45 and the brake lights 29, 31, 33 of the leading vehicle 13 and thereby prevent the automatic warning signal system 11 from activating the brake lights 29, 31, 33 of the leading vehicle 13, while not interfering with the normal operation of the brake lights 29, 31, 33 of the leading vehicle 13 when the brake switch 55 is closed, etc.

The circuit means 47 may include indicator means 67 for indicating when the information or warning means 41 has malfunctioned by providing the driver of the leading vehicle 13 with a signal in the event the information or warning means 41 does not work when it should. For example, the indicator means 67 may include an indicator light 69 for being mounted at the dashboard of the leading vehicle 13 for being activated in the event the detector means 45 detects a following vehicle 15 within the target area 17 and causes an electrical signal to be sent to the information or warning means 41, and the information or warning means 41 is "burned out" (e.g., if a light bulb that comprises part of the information or warning means 41 is "burned out") to thereby signal the driver of the leading vehicle 13 that something is wrong with the information or warning means 41. The indicator means 67 might also include audio means (e.g., a buzzer or the like) for providing the driver of the leading vehicle 13 with an audio signal in addition to, or instead of, the indicator light 69. As clearly shown in FIG. 5, the indicator means 67 preferably includes a resistor 71 in front of the indicator light 69 with the resistor 71 having a resistance that is higher than the normal resistance of the signal means 25 so that electrical current will normally pass through the signal means 25 and not the resistor 71 so that normally (i.e., when the information or warning means 41 is operable and not "burned out"), electrical current will not pass through the resistor 71 to the indicator light 69, but will pass through the resistor 71 to activate the indicator light 69 in the event any one of the light bulbs of the information or warning means 41 (i.e., the caution light means 43 or one of the caution lights 44) is "burned out" since, in such a case, the electric current through the information or warning means 41 is terminated, thus preventing any and all of the brake lights from coming on without the information or warning means 41 operating, as will now be apparent to those skilled in the art.

The circuit means 47 may include one or more diodes 73 for generally controlling the direction of current flow in various parts of the circuit as will now be apparent to those skilled in the art.

As hereinabove disclosed, the detector means 45 preferably has two or more distinct range sensitivity selections (e.g., a first or short range sensitivity selection and a second or long range sensitivity selection) that can be selected by way of the switch 49 or the like. The circuit means 47 may be designed to normally position the detector means 45 to the first or short range sensitivity selection, and may be designed to automatically switch the detector means 45 to the second or long range sensitivity selection under certain driving condition such as, for example, when the leading vehicle 13 reaches a certain speed, when the headlights 75 of the leading vehicle 13 are turned on, and/or when the windshield wipers 77 of the leading vehicle 13 are turned on. Thus, for example, the circuit means 47 may be designed to electrically connect the headlight switch 79 of the leading vehicle 13 and/or the windshield wiper switch 81 of the leading vehicle 13 through a resistor 82 to a coil 83 that, along with the switch 49, forms the relay circuit 51 so that the switch 49 will be automatically moved from a first position to a second position whenever headlight switch 79 and/or the windshield wiper switch 81 are closed and the coil 83 is electrically energized to thereby switch the detector means 45 from the first or short range sensitivity selection to the second or long range sensitivity selection as will now be apparent to those skilled in the art. The circuit means 47 preferably includes a high speed activated switch means 85 electrically connected to the coil 83 through the resistor 82 to electrically energize the coil 83 and thereby automatically switch the detector means 45 from the first or short range sensitivity selection to the second or long range sensitivity selection whenever the leading vehicle 13 is traveling above a certain preselected speed. The high speed activated switch means 85 is preferably substantially identical in operation and construction to the automatic minimum speed activated on/off switch means 65 but is set to close at a high speed rather than at a low or minimum speed. Such a design causes the detector means 45 to automatically switch to the second or long range sensitivity selection any time the headlights 75 and/or windshield wipers 77 are activated, and any time the vehicle 13 is traveling above the certain preselected speed, etc., as will now be apparent to those skilled in the art. The circuit means 47 preferably includes a manual long range selector switch 87 electrically connected to the coil 83 through the resistor 82 for allowing the driver of the leading vehicle 13 to manually electrically energize the coil 83, etc., to thereby switch the detector means 45 to the second or long range sensitivity selection for special conditions such as icy or slippery road conditions while speed is low, head lights and windshield wipers are not on with the automatic range sensitivity staying on the first or short range. In addition, the circuit means 47 preferably includes a manual short range selector switch 89 electrically interposed between the headlight switch 79, windshield wiper switch 81, high speed activated switch means 85, etc., to allow the driver of the vehicle 13 to set the detector means 45 to the first or short range sensitivity selection even when the headlight switch 79, windshield wiper switch 81, and/or high speed activated switch means 85, etc., are closed to normally cause the detector means 45 to automatically switch to the second or long range sensitivity selection for conditions like funeral processions, or certain traffic laws that require head lights to be turned on at all times while moving, etc. Thus, as clearly shown in FIG. 5, the manual short range selector switch 89 may be positioned to merely ground the electric signal that would otherwise pass from the headlight switch 79, windshield wiper switch 81, and/or high speed activated switch means 85, etc., through the resistor 82 to the coil 83 as will now be apparent to those skilled in the art. It should be noted that the manual long range selector switch 87 and the manual short range selector switch 89 are preferably positioned on the dashboard of the vehicle 13, or in some other position in easy reach of the driver, and preferably combined together as a double pole, double throw, center-off toggle switch or the like having a first or centered, neutral position with both switches 87, 89 opened, having a second or up position with the long range selector switch 87 closed and the short range selector switch 89 opened, and having a third or down position with the long range selector switch 87 opened and the short range selector switch 89 closed, etc., as will now be apparent to those skilled in the art. The circuit means 47 may include current limiting resistors 91 associated with the high speed activated switch means 85 and the manual long range selector switch 87 to help balance the flow of current therethrough as should now be apparent to those skilled in the art.

FIG. 6 shows schematically the circuit means 47 as modified for use in the event the leading vehicle 13 is towing a towed vehicle 19, such as a trailer or the like as shown in FIG. 3, and shows the signal means 2.25 as including the left and right brake lights 2.29, 2.31, and the high and/or center mount brake light 2.33, if any, of the towed vehicle 19. Furthermore, when the signal means 2.25 includes the typical brake light or lights of the towed vehicle 19, etc., the signal means 2.25 preferably includes an information or warning means 2.41 to clearly inform and/or warn the driver of the following vehicle 15 when the activation of the brake lights 2.29, 2.31, 2.33 of the towed vehicle 19 is caused by the automatic warning signal system 11, and not by the application of the brakes of the leading vehicle 13 or the towed vehicle 19. The warning means 2.41 is preferably substantially identical to the warning means 41 and reference should be made to the disclosure herein of the warning means 41 for a complete understanding of the warning means 2.41. The circuit means 47 disclosed in FIG. 6 also electrically connects the battery 26 to the detector means 45 through a manual on/off main switch 53, and then electrically connects the detector means 45 to the signal means 25 through a flasher means 63, etc., with the electric circuit including the various components and made through typical chassis grounds or the like as hereinabove disclosed relative to the circuit of FIG. 5. However, in FIG. 6, the circuit means 47 also electrically connects the battery 26 to the second detector means 2.45 through the second manual on/off main switch 2.53, and then electrically connects the detector means 2.45 to the second signal means 2.25, with the electric circuit made through typical chassis grounds or the like, and through the typical plug-and-jack type electrical connectors 54 or the like, as will now be apparent to those skilled in the art. The circuit means 47 of FIG. 6 also preferably includes a second single-pole, double-throw relay circuit 2.51 having a switch 2.49 and a coil 2.83, a second flasher means 2.63, and one or more additional diodes 2.73 for generally controlling the direction of current flow in various parts of the circuit, etc., as will now be apparent to those skilled in the art. It should be understood that elements of the circuit means 47 of FIG. 6 having prefix "2." on reference numerals corresponding to elements of the circuit means 47 of FIG. 5 are preferably substantially identical to those elements of the circuit means 47 of FIG. 5 and reference should be made to the disclosure of such elements relative to the circuit means 47 of FIG. 5 for a complete disclosure thereof.

Although the present invention has been described and illustrated with respect to preferred embodiments and preferred uses therefor, it is not to be so limited since modifications and changes can be made therein which are within the full intended scope of the invention.

What is claimed is:

1. An automatic warning signal system for use with a leading vehicle, an energy source, and a signal means that produces a warning signal when activated; the leading vehicle including at least one brake light and a brake switch for activating the at least one brake light when closed; the automatic warning signal system including:
   (a) detector means for detecting if a following vehicle comes within a target area behind the leading vehicle;
   (b) circuit means for coupling the detector means to the signal means and the energy source and for activating the signal means to automatically produce a warning signal to warn the driver of the following vehicle if the detector means detects the following vehicle within the target area behind the leading vehicle; and
   (c) means for preventing the circuit means from activating the signal means when the brake switch is closed.

2. The automatic warning signal system of claim 1 in which is included flasher means coupled by the circuit means to the detector means, the signal means, and the energy source for causing the signal means to produce intermittent warning signals when the detector means detects the following vehicle within the target area behind the leading vehicle.

3. The automatic warning signal system of claim 1 in which the signal means includes the at least one brake light of the leading vehicle so that the at least one brake light of the leading vehicle are activated when the detector means detects a following vehicle within the target area behind the leading vehicle even though the brake switch is not closed.

4. The automatic warning signal system of claim 3 in which the signal means includes warning means for warning the driver of the following vehicle when the at least one brake light of the leading vehicle are activated and the brake switch of the leading vehicle is not closed.

5. The automatic warning signal system of claim 4 in which the warning means includes a caution light means for spelling out an informative message.

6. The automatic warning signal system of claim 4 in which the warning means includes caution lights.

7. The automatic warning signal system of claim 1 in which is included an automatic minimum speed activated on/off switch means for preventing the circuit means from activating the signal means unless the leading vehicle is moving faster than a certain minimum speed.

8. The automatic warning signal system of claim 1 in which the detector means includes a plurality of distinct range sensitivity selections to vary the reach of the target area behind the leading vehicle.

9. The automatic warning signal system of claim 8 in which is included manual means for allowing the driver of the leading vehicle to manually select a distinct range sensitivity selection of the detector means.

10. The automatic warning signal system of claim 9 in which is included automatic means for automatically selecting a distinct range sensitivity selection of the detector means under certain predetermined conditions.

11. The automatic warning signal system of claim 4 in which is included indicator means for indicating when the warning means has malfunctioned.

12. The automatic warning signal system of claim 4 in which any malfunction of the warning means will break the electric circuit between the detector means and the at least one brake light of the leading vehicle.

13. The automatic warning signal system of claim 1 in which is included a manual on/off switch to turn the automatic warning signal system on and off.

14. An automatic warning signal system for warning the driver of a following vehicle when the following vehicle comes within a target area behind a leading vehicle or a towed vehicle being towed by the leading vehicle, the leading vehicle including at least one brake light and a brake switch for activating the at least one brake light when closed; the automatic warning signal system comprising:
   (a) an electrical energy source;
   (b) a first signal means associated with the leading vehicle for producing a warning signal when electrically energized to warn the driver of the following vehicle;
   (c) a second signal means associated with the towed vehicle for producing a warning signal when electrically energized to warn the driver of the following vehicle;
   (d) a first detector means for detecting if a following vehicle comes within a target area behind the leading vehicle;

(e) a second detector means for detecting if a following vehicle comes within a target area behind the towed vehicle;

(f) circuit means for electrically coupling the first detector means to the first signal means and the energy source, for electrically coupling the second detector means to the second signal means and the energy source, and for activating at least one of the first and second signal means to automatically produce a warning signal to warn the driver of the following vehicle if at least one of the first and second detector means detects the following vehicle within the target area behind the leading or towed vehicle; and (g) means for preventing the circuit means from activating the signal means when the brake switch is closed.

15. The automatic warning signal system of claim 14 in which is included a manual on/off switch to turn the first detector means of the automatic warning signal system on and off.

16. The automatic warning signal system of claim 15 in which is included a second manual on/off switch to turn the second detector means of the automatic warning signal system on and off.

* * * * *